(12) United States Patent
Preston

(10) Patent No.: US 8,013,463 B2
(45) Date of Patent: Sep. 6, 2011

(54) METHOD AND APPARATUS FOR GENERATING ELECTRICITY WHILE A USER IS MOVING

(76) Inventor: Joshua S. Preston, Vernon, CT (US)

( * ) Notice: Subject to any disclaimer, the term of this patent is extended or adjusted under 35 U.S.C. 154(b) by 520 days.

(21) Appl. No.: 12/246,858

(22) Filed: Oct. 7, 2008

(65) Prior Publication Data

US 2009/0230698 A1   Sep. 17, 2009

Related U.S. Application Data

(60) Provisional application No. 60/978,386, filed on Oct. 8, 2007, provisional application No. 61/026,087, filed on Feb. 4, 2008.

(51) Int. Cl.
*H02P 9/04* (2006.01)
*F03B 13/00* (2006.01)
*A43B 7/04* (2006.01)
(52) U.S. Cl. .......................... 290/54; 290/1 R
(58) Field of Classification Search .................. 290/1 R, 290/43, 54; 310/75 B
See application file for complete search history.

(56) References Cited

U.S. PATENT DOCUMENTS

| | | | |
|---|---|---|---|
| 6,201,314 B1 * | 3/2001 | Landry | 290/54 |
| 6,239,501 B1 * | 5/2001 | Komarechka | 290/1 R |
| 6,281,594 B1 * | 8/2001 | Sarich | 290/1 R |
| 6,662,704 B2 * | 12/2003 | Nelson | 91/314 |
| 7,005,757 B2 * | 2/2006 | Pandian | 290/1 R |
| 7,219,449 B1 * | 5/2007 | Hoffberg et al. | 36/88 |
| 2001/0035723 A1 | 11/2001 | Pelrine et al. | |
| 2004/0112247 A1 | 6/2004 | Powell | |
| 2006/0046907 A1 | 3/2006 | Rastegar et al. | |
| 2008/0127510 A1 * | 6/2008 | Yang | 36/29 |

\* cited by examiner

*Primary Examiner* — Burton Mullins
(74) *Attorney, Agent, or Firm* — McCarter & English, LLP

(57) ABSTRACT

The present disclosure provides for systems and methods for generating electricity while a user is moving. More particularly, the present disclosure provides for improved systems and methods for generating electricity while a user is walking or running. In exemplary embodiments, the present disclosure provides for improved systems and methods for generating electricity while a user is moving, wherein the systems and methods for generating electricity while a user is moving are portable, and wherein the systems and methods provide for a high output of auxiliary power to electronic devices and/or loads.

30 Claims, 5 Drawing Sheets

METHOD AND APPARATUS FOR GENERATING ELECTRICITY WHILE A USER IS MOVING

CROSS REFERENCE TO RELATED APPLICATIONS

This application claims the benefit of U.S. Provisional Application No. 60/978,386 filed Oct. 8, 2007, and U.S. Provisional Application No. 61/026,087 filed Feb. 4, 2008, both of which are herein incorporated in their entireties.

BACKGROUND

1. Technical Field The present disclosure relates to a system and method for generating electricity while a user is moving and, more particularly, to a system and method for generating electricity while a user is walking or running.

2. Background Art

In general, with the increasing integration of electronic devices (e.g., cell phones, portable music players, etc.) in our lives, the need for auxiliary power supplies is increasing. One typical option is to charge batteries or the like from a traditional power source, e.g., a power outlet. However, traditional power sources are not always close and/or easily accessible to users of electronic devices and/or loads.

Some auxiliary power supply devices that attempt to generate electricity have been proposed. However, such auxiliary power supply devices are generally bulky, cumbersome and/or cannot generate a large amount of power, due to the construction of the device/assembly, for example. In addition, some of these auxiliary power supply devices are expensive and/or complex. In general, some auxiliary power supply devices are not capable of generating a sufficient amount of power.

Thus, despite efforts to date, a need remains for cost effective and efficient systems/methods that provide for the generation of an auxiliary supply of electricity. In addition, a need remains for systems/methods that provide for a high output of auxiliary power, and where the systems/methods do not require an expensive, excessive and/or cumbersome amount of parts.

These and other inefficiencies and opportunities for improvement are addressed and/or overcome by the systems and methods of the present disclosure.

SUMMARY

The present disclosure provides an advantageous system and method for generating electricity while a user is moving. In exemplary embodiments, the present disclosure provides for improved systems and methods for generating electricity while a user is walking or running. In exemplary embodiments, the present disclosure provides for improved systems/methods for generating electricity while a user is moving, wherein the systems/methods for generating electricity while a user is moving are portable and/or easily accessible, and wherein the systems/methods provide for a high output of auxiliary power (e.g., electricity) to electronic devices and/or loads.

The present disclosure provides for an electricity generating system including a fluid vessel associated with footwear of a user, the fluid vessel configured and dimensioned to house a fluid and to expel at least a portion of the fluid from the fluid vessel when a first force is applied to the fluid vessel; a mechanical-to-electrical generator sub-assembly in fluid communication with the fluid vessel, the mechanical-to-electrical generator sub-assembly configured and dimensioned to receive the fluid expelled from the fluid vessel and to generate electricity utilizing the expelled fluid, the mechanical-to-electrical generator sub-assembly including a mechanical generator in fluid communication with the fluid vessel; an electrical generator coupled to the mechanical generator; and an external connection coupled to the electrical generator, the external connection configured to provide power to electronic devices.

The present disclosure also provides for an electricity generating system wherein the fluid vessel is selected from the group consisting of a hydraulic vessel, pneumatic vessel, hydraulic cylinder, pneumatic cylinder, hydraulic pump, pneumatic pump, hydraulic bladder and pneumatic bladder. The present disclosure also provides for an electricity generating system wherein the fluid vessel further includes a first member and a second member, the first member and the second member configured and dimensioned to form a fluid cavity, the fluid cavity configured and dimensioned to house the fluid. The present disclosure also provides for an electricity generating system wherein the first member is positioned on top of the second member, and the first member and the second member are sealed at their edges to form the fluid cavity.

The present disclosure also provides for an electricity generating system wherein the fluid vessel is embedded in or attached to the footwear. The present disclosure also provides for an electricity generating system wherein at least a portion of the fluid is expelled from the fluid vessel when the user applies at least a portion of the user's weight to the fluid vessel. The present disclosure also provides for an electricity generating system wherein the mechanical-to-electrical sub-assembly is in fluid communication with the fluid vessel through at least one fluid line. The present disclosure also provides for an electricity generating system wherein the mechanical-to-electrical sub-assembly is not directly mounted to or embedded in the footwear.

The present disclosure also provides for an electricity generating system wherein the mechanical generator is an actuator cylinder or turbine. The present disclosure also provides for an electricity generating system wherein the mechanical generator further includes a piston configured and dimensioned to apply a second force to a pushrod when the fluid is received from the fluid vessel; and a spring member configured and dimensioned to apply a third force to the pushrod after the first force ceases to be applied to the fluid vessel, wherein after the third force to the pushrod is applied, the pushrod retracts the piston thereby forcing the received fluid to return to the fluid vessel.

The present disclosure also provides for an electricity generating system wherein the mechanical-to-electrical sub-assembly is attached or mounted to a waist-holster connected to the user. The present disclosure also provides for an electricity generating system wherein after the first force ceases to be applied to the fluid vessel, the expelled fluid returns to the fluid vessel.

The present disclosure also provides for an electricity generating system further including a charge regulation device in communication with the electrical generator; and an adjustment device in communication with the charge regulation device, the adjustment device configured to allow the user to adjust the charging load on the electrical generator and tune the charge regulation device. The present disclosure also provides for an electricity generating system further including a charge regulation device in communication with the electrical generator; and a pressure transducer configured to provide a signal in response to a measured pressure of the system to the charge regulation device, wherein the charge regulation device dynamically adjusts the load on the electrical generator based upon the signal. The present disclosure also provides for an electricity generating system further including a charge regulation device in communication with the electrical generator; and a mass-flow sensor configured to provide a signal in response to a measured flow of the system to the charge regulation device, wherein the charge regulation device dynamically adjusts the load on the electrical generator based upon the signal.

The present disclosure also provides for a method for generating electricity including providing a fluid vessel associated with footwear of a user, the fluid vessel configured and dimensioned to house a fluid and to expel at least a portion of the fluid from the fluid vessel when a first force is applied to the fluid vessel; providing a mechanical-to-electrical generator sub-assembly in fluid communication with the fluid vessel, the mechanical-to-electrical generator sub-assembly comprising a mechanical generator coupled to an electrical generator, and an external connection coupled to the electrical generator, the external connection configured to provide power to electronic devices; applying a first force to the fluid vessel so that at least a portion of the fluid from the fluid vessel is expelled to the mechanical-to-electrical sub-assembly; and generating electricity with the mechanical-to-electrical generator sub-assembly by utilizing the expelled fluid.

The present disclosure also provides for a method for generating electricity wherein the fluid vessel is selected from the group consisting of a hydraulic vessel, pneumatic vessel, hydraulic cylinder, pneumatic cylinder, hydraulic pump, pneumatic pump, hydraulic bladder and pneumatic bladder. The present disclosure also provides for a method for generating electricity wherein the fluid vessel further includes a first member and a second member, the first member and the second member configured and dimensioned to form a fluid cavity, the fluid cavity configured and dimensioned to house the fluid. The present disclosure also provides for a method for generating electricity wherein the first member is positioned on top of the second member, and the first member and the second member are sealed at their edges to form the fluid cavity.

The present disclosure also provides for a method for generating electricity wherein the fluid vessel is embedded in or attached to the footwear. The present disclosure also provides for a method for generating electricity wherein at least a portion of the fluid is expelled from the fluid vessel when the user applies at least a portion of the user's weight to the fluid vessel. The present disclosure also provides for a method for generating electricity wherein the mechanical-to-electrical sub-assembly is in fluid communication with the fluid vessel through at least one fluid line. The present disclosure also provides for a method for generating electricity wherein the mechanical-to-electrical sub-assembly is not directly mounted to or embedded in the footwear.

The present disclosure also provides for a method for generating electricity wherein the mechanical generator is an actuator cylinder or turbine. The present disclosure also provides for a method for generating electricity wherein the mechanical generator further includes a piston configured and dimensioned to apply a second force to a pushrod when the fluid is received from the fluid vessel; and a spring member configured and dimensioned to apply a third force to the pushrod after the first force ceases to be applied to the fluid vessel, wherein after the third force to the pushrod is applied, the pushrod retracts the piston thereby forcing the received fluid to return to the fluid vessel.

The present disclosure also provides for a method for generating electricity wherein the mechanical-to-electrical sub-assembly is attached or mounted to a waist-holster connected to the user. The present disclosure also provides for a method for generating electricity wherein after the first force ceases to be applied to the fluid vessel, the expelled fluid returns to the fluid vessel.

The present disclosure also provides for a method for generating electricity further including a charge regulation device in communication with the electrical generator; and an adjustment device in communication with the charge regulation device, the adjustment device configured to allow the user to adjust the charging load on the electrical generator and tune the charge regulation device. The present disclosure also provides for a method for generating electricity further including a charge regulation device in communication with the electrical generator; and a pressure transducer configured to provide a signal in response to a measured pressure of the system to the charge regulation device, wherein the charge regulation device dynamically adjusts the load on the electrical generator based upon the signal. The present disclosure also provides for a method for generating electricity further including a charge regulation device in communication with the electrical generator; and a mass-flow sensor configured to provide a signal in response to a measured flow of the system to the charge regulation device, wherein the charge regulation device dynamically adjusts the load on the electrical generator based upon the signal.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
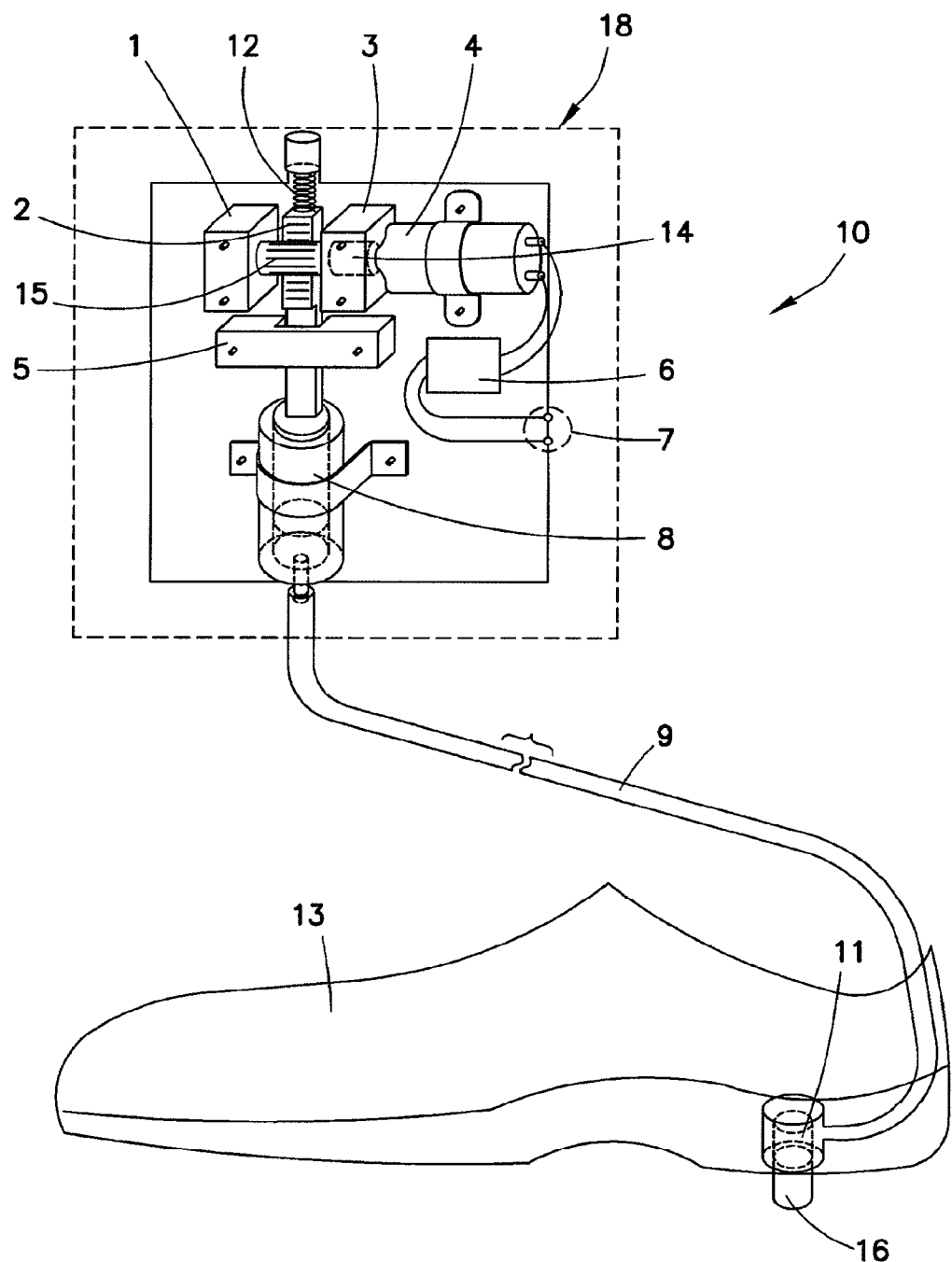
FIG. 1 is a frontal, partially exploded view of an embodiment of a system for generating electricity according to the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides for systems and methods for generating electricity while a user is moving. More particularly, the present disclosure provides for improved systems and methods for generating electricity while a user is walking or running. In exemplary embodiments, the present disclosure provides for improved systems/methods for generating electricity while a user is moving, wherein the systems/methods for generating electricity while a user is moving are portable, and wherein the systems and methods provide for a high output of auxiliary power to electronic devices and/or loads.

Current practice provides that auxiliary power supply devices generally may require bulky, cumbersome and/or expensive designs and/or components in an effort to attempt to generate electricity. These requirements are inefficient and/or costly. In addition, such devices generally cannot generate a large amount of power. Current practice also provides that as electronic devices (e.g., cell phones, portable music players, etc.) are increasingly integrated into our daily lives, there remains a need for cost effective and efficient systems/methods that provide for the generation of an auxiliary supply of electricity.

In exemplary embodiments, the present disclosure provides for improved, cost effective and efficient systems/methods for generating electricity while a user is moving (e.g., walking or running), thereby providing a significant commercial and manufacturing advantage as a result. In exemplary embodiments, the present disclosure also provides for improved systems/methods for generating electricity while a user is moving, wherein the systems/methods for generating electricity while a user is moving are portable (e.g., easily accessible), and wherein the systems/methods provide for a high output of auxiliary power (e.g., electricity), thereby providing a significant commercial advantage as a result.

Referring now to the drawings, and in particular to FIG. 1, there is illustrated a system 10 for generating electricity depicting an embodiment of the present disclosure. Typically, system 10 includes a fluid vessel 11 in communication with a mechanical-to-electrical generator sub-assembly 18. In exemplary embodiments, fluid vessel 11 is in communication with a mechanical generator 8 of a mechanical-to-electrical generator sub-assembly 18.

In general, the fluid vessel 11 is associated with footwear 13 (e.g., shoe, boot, sandal, sock, etc.) of a user. In exemplary embodiments, fluid vessel 11 is embedded in (in whole or in part) and/or is attached to footwear 13. The fluid vessel 11 may be removable from the footwear 13, or the fluid vessel 11 may be permanently affixed to and/or embedded in the footwear 13.

Exemplary fluid vessel 11 takes the form of a hydraulic or pneumatic vessel, although the present disclosure is not limited thereto. Rather, fluid vessel 11 may take a variety of forms. For example, in one embodiment, fluid vessel 11 is a hydraulic cylinder or a hydraulic pump. In another embodiment, fluid vessel 11 is a pneumatic cylinder or pneumatic pump. However, fluid vessel 11 may be of any suitable shape or size. In general, fluid vessel 11 is a vessel that is configured and dimensioned to house a fluid (e.g., a working fluid such as liquid or gas), and which is also configured and dimensioned to expel at least a portion of the fluid from the fluid vessel 11 when a force is applied to the fluid vessel 11 (e.g., when a user applies at least a portion of the user's weight to the fluid vessel 11). In another embodiment of the present disclosure, the fluid vessel 11 of the footwear 13 is an insole of the footwear 13 that is configured and dimensioned to house a fluid (e.g., liquid or gas), and which is also configured and dimensioned to expel at least a portion of the fluid from the fluid vessel 11 when a force is applied to the fluid vessel 11.

In one embodiment of the present disclosure, fluid vessel 11 is a hydraulic cylinder, and a stationary part of the hydraulic cylinder is embedded in the sole of the footwear 13, and at least a portion of piston 16 or the like of the hydraulic cylinder protrudes through the bottom of the sole of the footwear 13. In an alternative embodiment, at least a portion of the stationary part of the hydraulic cylinder protrudes through the bottom of the sole of the footwear 13, and at least a portion of piston 16 of the hydraulic cylinder protrudes through the bottom of the sole of the footwear 13. In another embodiment, both the stationary part of the hydraulic cylinder and the piston 16 are located below/beneath the sole of the footwear 13. In general, the fluid vessel 11 may be located anywhere on and/or in the footwear 13 so that when a force is applied to the fluid vessel 11 (e.g., when a user takes a step and/or plants the user's foot), at least a portion of the fluid from the fluid vessel 11 is forced/expelled from the fluid vessel 11 to the mechanical-to-electrical sub-assembly 18.

Figure 5:
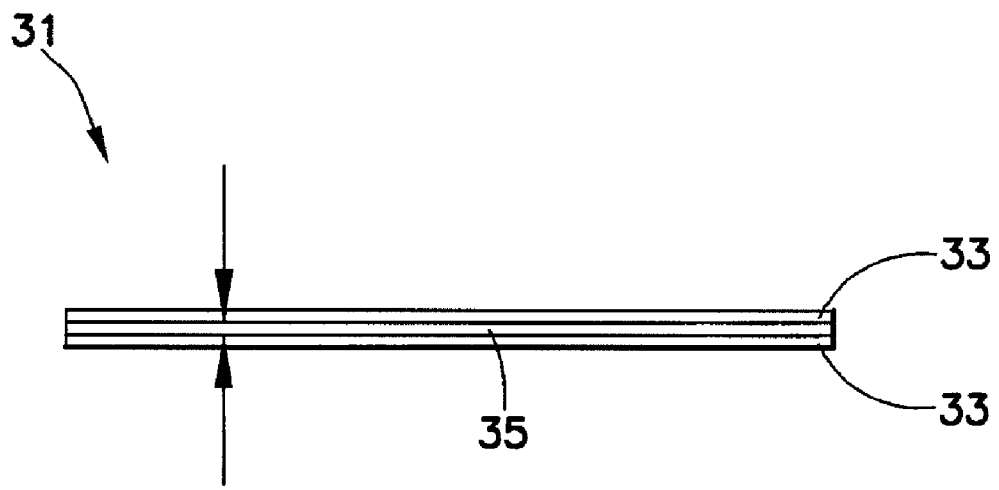
FIG. 5 is a side view of an exemplary embodiment of a fluid vessel according to the present disclosure.
Figure 6:
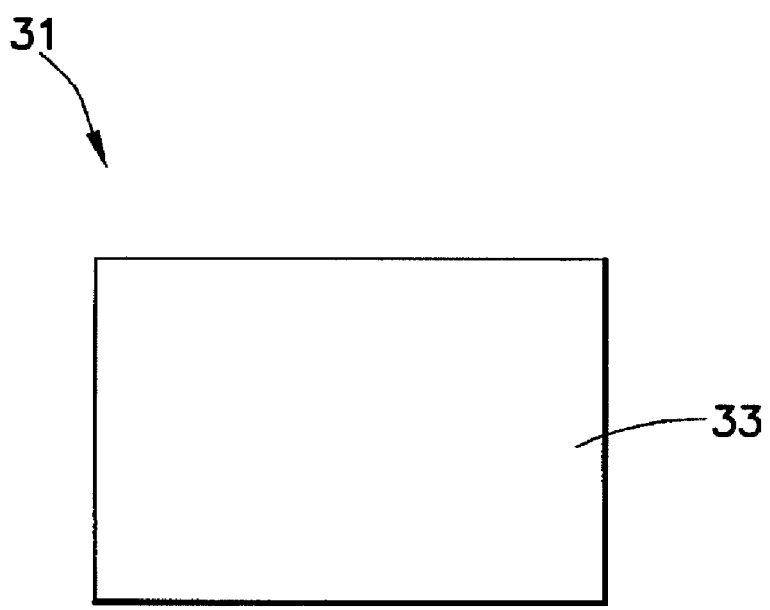
FIG. 6 is a top view of an exemplary embodiment of a fluid vessel according to the present disclosure.

In another embodiment and as shown in FIGS. 5 and 6, fluid vessel 31 is a vessel that is configured and dimensioned to house a fluid (e.g., liquid or gas) within a fluid cavity 35, and fluid vessel 31 is also configured and dimensioned to expel at least a portion of the fluid from the fluid vessel 31 to the mechanical-to-electrical sub-assembly 18 when a force is applied to the fluid vessel 31. In general and as shown in FIG. 5, fluid vessel 31 includes two members 33 that form a fluid cavity 35. In one embodiment, the two members 33 are two plates that are configured and dimensioned to form a fluid cavity 35. For example, the two members may be two thin, relatively rigid plates or the like that are stacked on top of one another to form the fluid cavity 35.

In exemplary embodiments, the two members 33 are sealed at their edges/perimeters to form the fluid cavity 35, although the present disclosure is not limited thereto. In general, the fluid cavity 35 of fluid vessel 31 may be opened and closed. For example, when a force is applied to the fluid vessel 31 (e.g., when a user applies at least a portion of the user's weight to the fluid vessel 31), the two members 33 are forced together, thereby causing a rise in pressure in the fluid cavity of the fluid vessel 31, which thereby causes the fluid vessel 31 to expel/force at least a portion of the fluid from the fluid vessel 31 to the mechanical generator 8. In an exemplary embodiment, the inner surfaces of the two members 33 mate together to facilitate a large fluid volume displacement when the two members 33 are forced together.

In general, the fluid vessel 31 is in fluid communication with mechanical generator 8 of a mechanical-to-electrical sub-assembly 18. In one embodiment and as shown in FIGS. 1 and 5, the fluid vessel 31 is in fluid communication with the mechanical-to-electrical sub-assembly 18 via at least one fluid line 9. In an alternative embodiment, fluid vessel 31 is in direct fluid communication with the mechanical-to-electrical sub-assembly 18, with no substantial fluid line 9 (e.g., the fluid vessel 31 and the mechanical-to-electrical sub-assembly 18 are both located in/on the footwear).

Typically, when the user stops applying at least a portion of the user's weight to the fluid vessel 31 (e.g., when the user lifts the user's foot), the two members 33 retract apart (e.g., return to their original positions), thereby opening and/or widening the fluid cavity 35 so that the expelled fluid may return back to the fluid cavity 35 from the mechanical generator 8. In one embodiment of the present disclosure, elastic material or the like, for example, may be placed between the two members 33 to facilitate the re-opening and/or widening of the fluid cavity 35 after the two members 33 are forced together, and after the user stops applying at least a portion of the user's weight to the fluid vessel 31.

In general the two members 33 may be sealed at their edges/perimeters to form the fluid cavity 35 in a variety of ways. For example, the two members 33 may be sealed/joined with a metallic wire mesh or the like. In one embodiment, the two members 33 are sealed/joined with a polymer-infused metallic wire mesh (e.g., high-pressure compressed gas line material). Alternatively, the two members 33 may be sealed/joined directly with a polymer sheet or the like at the edges/perimeters, with or without the metallic wire mesh or the like. In another embodiment, the two members 33 are sealed/joined with a gasket (e.g., a compressible gasket). In one embodiment of the present disclosure, a fluid bladder (e.g., a hydraulic bladder, pneumatic bladder, etc.) may also be placed between the two members 33 to form the fluid cavity 35.

In general, the planar area of the two members 33 is sized such that the fluid vessel 31 may be placed under, attached to and/or embedded in at least a part of the footwear 13 associated with the user's foot. For example, the fluid vessel 31 may be attached to and/or embedded in the sole of the footwear 13. In one embodiment, the planar area of the two members 33 is sized such that the fluid vessel 31 is placed under, attached to and/or embedded in substantially most of the footwear associated with the user's foot. The planar area of the two members 33 may be sized such that the fluid vessel 31 is placed under, attached to and/or embedded in substantially all of the footwear associated with the user's foot.

The two members 33 of fluid vessel 31 may or may not be substantially flat. In one embodiment, the two members 33 are substantially flat. In an alternative embodiment, the two members are not substantially flat, and are configured and dimensioned to substantially conform to the curves/shapes of the user's footwear and/or foot. For example, the surfaces of the two members 33 that contact the footwear/foot may be shaped to facilitate even contact areas (e.g., flat and non-flat contact areas).

In exemplary embodiments, fluid vessel 31 is embedded in (in whole or in part) and/or is attached to footwear 13 (e.g., shoe, boot, sandal, sock, etc.) of a user. The fluid vessel 31 may be removable from the footwear 13, or the fluid vessel 31 may be permanently affixed to and/or embedded in the footwear 13. For example, the fluid vessel 31 may be affixed/attached and/or adhered to the sole of the footwear. The fluid vessel 31 may be affixed/attached and/or adhered to any portion of the sole of the footwear (e.g., top of the sole, bottom of the sole, etc.). Alternatively, the fluid vessel 31 may be implanted and/or embedded in the sole of the footwear 13 during or after manufacture of the sole of the footwear.

In exemplary embodiments and as shown in FIGS. 1-5, when a user takes a step (e.g., plants the user's foot down) onto the foot/footwear on which the fluid vessel 11 and/or 31 is present, the user applies at least a portion of the user's weight to the fluid vessel 11 and/or 31, thereby causing a rise in pressure in the fluid vessel 11 and/or 31, which thereby causes the fluid vessel 1 and/or 31 to expel/force at least a portion of the fluid from the fluid vessel 11 and/or 31 to the mechanical-to-electrical generator sub-assembly 18. Typically, fluid vessel 11 and/or 31 is in fluid communication with a mechanical generator 8 of a mechanical-to-electrical generator sub-assembly 18. For example and with reference to FIG. 1, when a user applies at least a portion of the user's weight to the piston 16 or the like of fluid vessel 11, this thereby causes a rise in pressure in the fluid vessel 11. In an alternative embodiment, fluid vessel 31 does not include a piston or the like, and when a user applies at least a portion of the user's weight to the fluid vessel 31, this thereby causes a rise in pressure in the fluid vessel 31 as discussed above.

For example and as shown in FIG. 1, the fluid vessel 11 may be in fluid communication with a mechanical generator 8 of the mechanical-to-electrical generator sub-assembly 18 via at least one fluid line 9. Alternatively, fluid vessel 11 is in direct fluid communication with the mechanical-to-electrical generator sub-assembly 18, with no substantial fluid line 9 (e.g., the fluid vessel 11 and the mechanical-to-electrical generator sub-assembly 18 are both located in/on the footwear 13).

Fluid line 9 may take a variety of forms, including, without limitation, a hydraulic or pneumatic line, hosing and/or tubing, or the like. After the user applies at least a portion of the user's weight to the fluid vessel 11 and/or 31 thereby causing a rise in pressure in the fluid vessel 11 and/or 31, the increased pressure in the fluid vessel causes at least a portion of the fluid in the fluid vessel 11 and/or 31 to flow to the mechanical generator 8, e.g., through the at least one fluid line 9. The at least one fluid line 9 may be removable from the system 10. For example, the at least one fluid line 9 may be removable from the fluid vessel and/or from the mechanical-to-electrical generator sub-assembly 18 via a quick-disconnect fluid fitting (e.g., a quick-disconnect hydraulic or pneumatic fitting).

In exemplary embodiments, the mechanical generator 8 is an actuator cylinder, although the present disclosure is not limited thereto. Rather, the mechanical generator 8 may take a variety of forms. For example, the mechanical generator 8 may be, for example, a turbine or the like. In one embodiment, the mechanical generator 8 may be a hydraulic and/or fluid cylinder. For example and as shown in FIG. 1, the fluid being forced/expelled from the fluid vessel 11 and/or 31 to and/or into the mechanical generator 8 (e.g., hydraulic and/or fluid cylinder) causes a piston or the like of the mechanical generator 8 to extrude/extend from its housing, thereby applying a force to a pushrod 2 or the like. In one embodiment, the motion of the pushrod 2 may be guided by a linear bearing 5. The linear bearing 5 may also serve to limit the range of motion of the pushrod 2 or the like, so that the pushrod 2 cannot fall-out or overextend.

Typically, the pushrod 2 or the like has engagement means (e.g., gear teeth, grooves, protrusions, etc.) at one end which are engaged with a driveshaft 15 or the like. In general, the force on the pushrod 2 causes the driveshaft 15 to rotate in the driveshaft supports 1, 3.

In exemplary embodiments, the driveshaft 15 or the like is connected and/or coupled to an electrical generator 4. In one embodiment, the driveshaft 15 or the like is connected to a gearbox/electrical generator combination 4 via a one-way clutch bearing 14. Typically, the one-way clutch bearing 14 is installed in a direction such that it engages an input shaft of the gearbox/electrical generator combination 4 when rotated in this direction, forcing the rotation of the electrical generator 4. As a result of the rotation, electricity is generated. In general and as shown in FIG. 1, the system 10 further includes a power conditioning device and/or charge regulation/management device 6 and an external connection 7. In one embodiment, the power conditioning device and/or charge regulation/management device 6 is a power conditioning circuit and/or charge regulation/management circuit 6. Typically, the power conditioning device and/or charge regulation/management device 6 is coupled to and/or in communication with the electrical generator 4 and the external connection 7. The system 10 may provide power to electronic devices via the external connection 7.

In an exemplary embodiment, when the pushrod 2 or the like is at the top of its stroke, a spring or spring member 12 or the like is in compression. In general, the compressed spring 12 is applying a force to the pushrod 12 in the downward direction. For example, when the user stops applying at least a portion of the user's weight to the fluid vessel 11 (e.g., when the user lifts the user's foot), the force of the compressed spring 12 or the like retracts the piston of the mechanical generator 8 (e.g., actuator cylinder), thereby forcing the fluid to flow back into the fluid vessel 11 associated with the footwear 13. In exemplary embodiments of the present disclosure, this cycle is repeated with each step (e.g., each lifting of the foot) the user takes.

Figure 2:
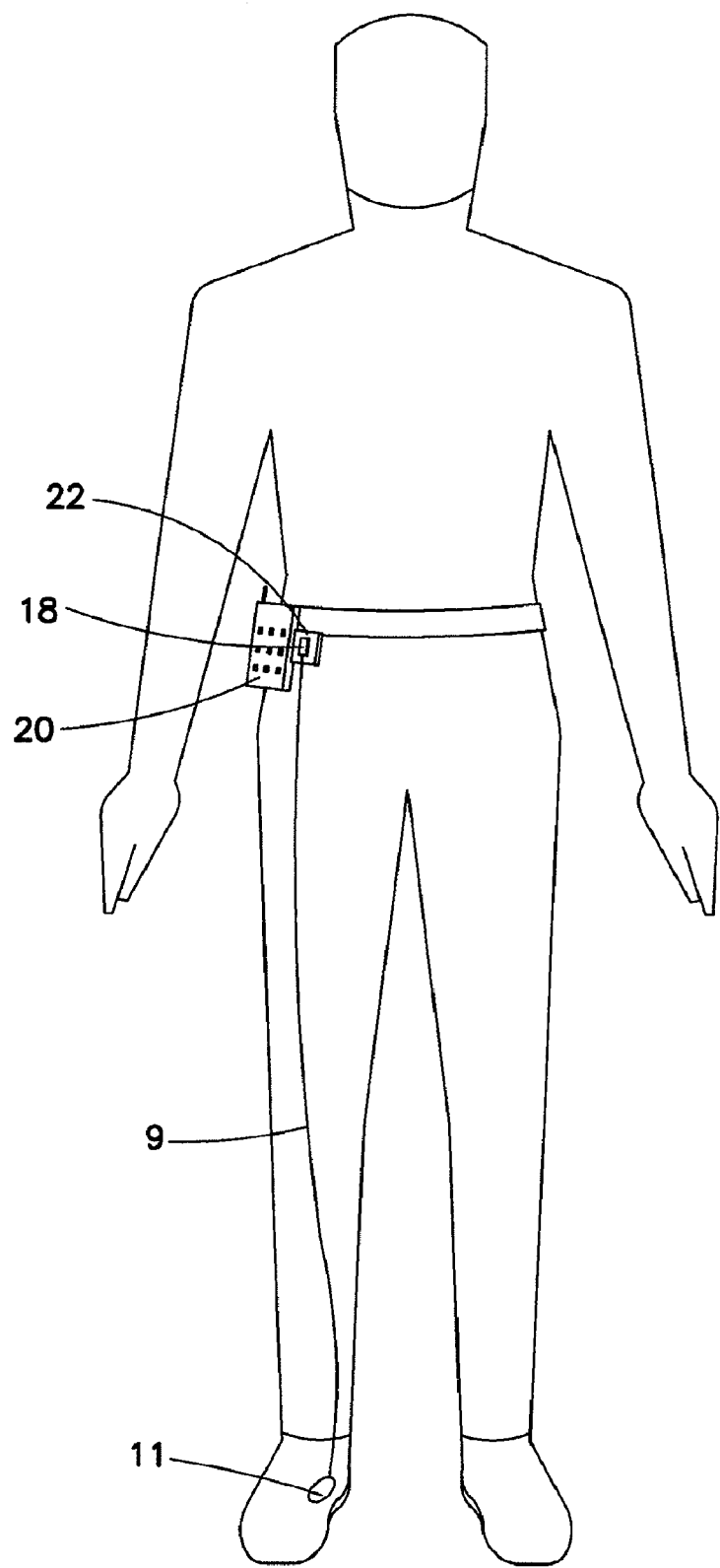
FIG. 2 is a frontal view of a user and an embodiment of a system for generating electricity according to the present disclosure.

In general, the system 10 may be used to provide power to electronic devices (e.g., charging the batteries of cell phones, portable music players, computers, DVD players, etc.). In one embodiment, the system 10 provides power to electronic devices via the external connection 7. One advantage to at least one embodiment of the present disclosure is that a substantial portion of the mechanical parts of the system 10, e.g., the parts of the mechanical-to-electrical generator sub-assembly 18, may be located and/or mounted at any location desired by the user, thereby providing a significant commercial and manufacturing advantage as a result. For example and as shown in FIG. 2, the user may place and/or attach/mount the mechanical-to-electrical generator sub-assembly 18 in a waist-holster/waist-holder/beltclip 22 or the like (e.g., a cell-phone and/or music player waist-holster/waist-holder/beltclip or the like). In alternative embodiments, the mechanical-to-electrical generator sub-assembly 18 (or sub-assemblies or parts thereof) may be placed/located at any location desired by the user (e.g., in the user's hand, attached/mounted to the user's footwear 13, embedded/integrated into the user's footwear 13, in the user's pocket, around the user's head/neck, etc.). Thus, the present disclosure provides for improved systems and methods for generating electricity while a user is moving, wherein the systems and methods for generating electricity while a user is moving are portable and/or easily accessible, and wherein the systems and methods provide for a high output of auxiliary power (e.g., electricity) to electronic devices and/or loads.

In an exemplary embodiment of the present disclosure and as depicted in FIG. 2, the mechanical-to-electrical generator sub-assembly 18 may be integrated into and/or attached to a user's waist-holster/waist-holder/beltclip 22 or the like. In one embodiment, the mechanical-to-electrical generator sub-assembly 18 is directly integrated and/or embedded into a user's waist-holster/waist-holder 22 or the like. In another embodiment, the mechanical-to-electrical generator sub-assembly 18 is attached/mounted to a user's waist-holster/waist-holder 22 or the like. For example, when the user moves so that the user applies at least a portion of the user's weight to the fluid vessel 11 (e.g., when the user walks/runs and/or lifts and plants the user's foot), the system 10 will generate electricity that can be used to charge at least one electronic device 20. In one embodiment and as shown in FIG. 2, when the user moves so that the user applies at least a portion of the user's weight to the fluid vessel 11, the system 10 will generate electricity that can be used to charge the at least one electronic device 20 as the electronic device 20 is housed/mounted to the user's waist-holster/waist-holder 22 or the like, and wherein the mechanical-to-electrical generator sub-assembly 18 is attached/mounted to the user's waist-holster/waist-holder 22 or the like. In one embodiment and as depicted in FIGS. 1 and 2, the fluid line 9 provides for the fluid communication between the fluid vessel 11 associated with the footwear 13 and the mechanical-to-electrical generator sub-assembly 18.

In general, the system 10 provides for tremendous flexibility which allows a user to tune desired implementations of the system 10 to the power demands of various applications. In exemplary embodiments, the fluid ratio of the fluid vessel 11 and the mechanical generator 8 may be set appropriately to adjust to the amount of force applied to the mechanical generator 8 in accordance to the principles of fluid dynamics. In one embodiment, the hydraulic ratio of the fluid vessel 11 (e.g., a first hydraulic cylinder) and the mechanical generator 8 (e.g., a second hydraulic cylinder) may be set appropriately to adjust to the amount of force applied to the mechanical generator 8 in accordance to the principles of hydraulics. For example, a large force and small deflection at the fluid vessel 11 (e.g., when a user applies at least a portion of the user's weight to the fluid vessel 11 associated with the user's footwear 13) may be utilized to create a large deflection at a small force at the mechanical generator 8 end of the fluid line 9 by utilizing a wide piston 16 or the like at the footwear 13 end and a narrow piston or the like at the mechanical generator 8 end of the system 10. In addition, flexibility also exists, for example, in the selection of the gearing of the mechanical generator 8 and/or of the mechanical-to-electrical generator sub-assembly 18. In another embodiment of the present disclosure, gases, such as, for example, air, may be used as the working fluid of the system 10 in place of a hydraulic fluid.

Figure 3:
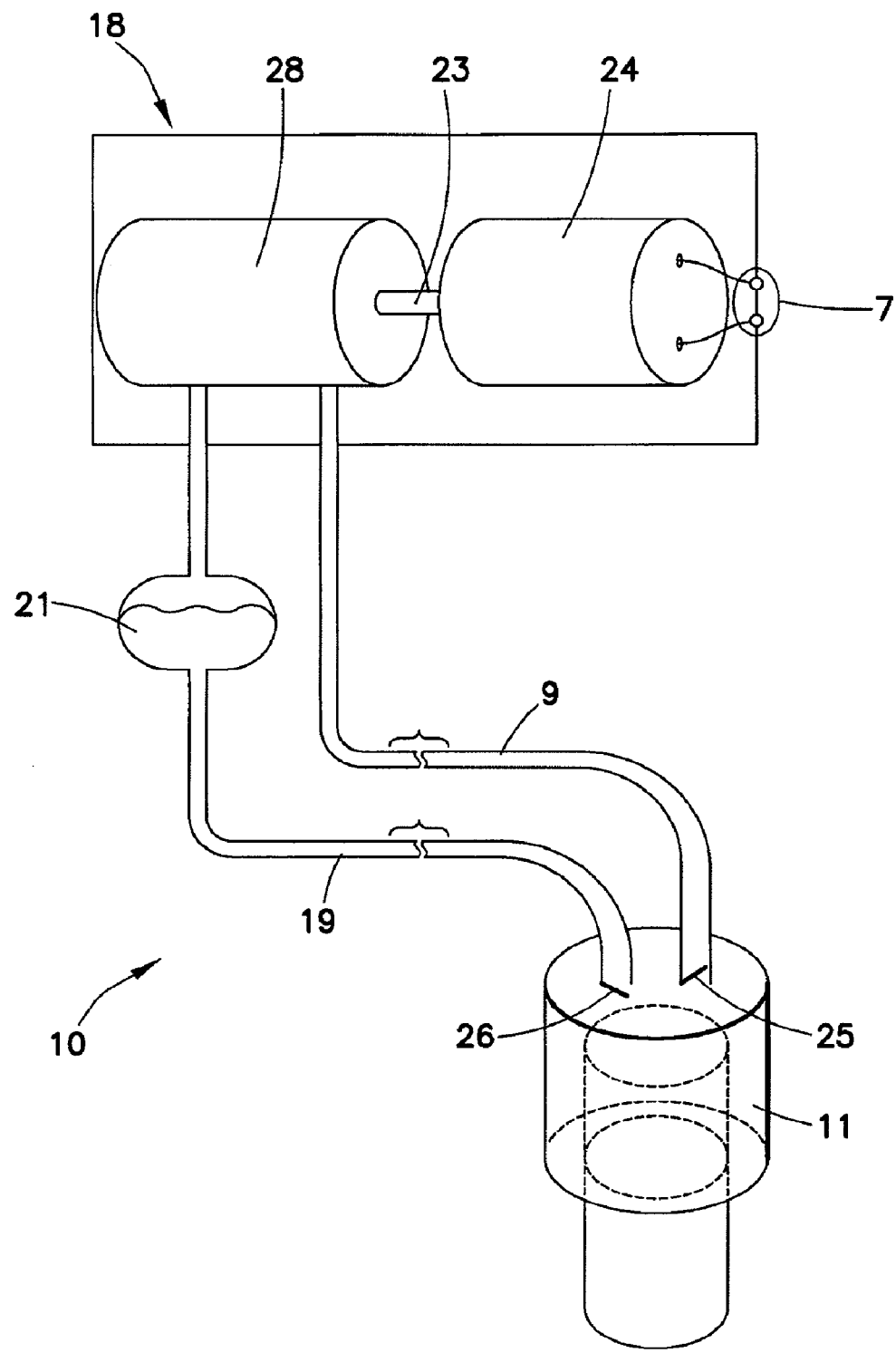
FIG. 3 is a frontal, partially exploded view of an embodiment of a system for generating electricity according to the present disclosure.

In another embodiment of the present disclosure and as shown in FIG. 3, the system 10 includes a fluid vessel 11 (e.g., a hydraulic and/or fluid pump) associated with the footwear 13 of a user, wherein when the user applies at least a portion of the user's weight to the fluid vessel 11, fluid motion is thereby input to a mechanical generator 28 (e.g., a turbine) of a mechanical-to-electrical generator sub-assembly 18. For example and as shown in FIG. 3, the fluid vessel 11 may be a hydraulic and/or fluid pump. In general, the hydraulic and/or fluid pump forces fluid through a hydraulic and/or fluid circuit, wherein the circuit includes the hydraulic and/or fluid pump 11, a feed line 9, a turbine 28, a reservoir 21, and return line 19. For example, when the user applies at least a portion of the user's weight to the hydraulic and/or fluid pump (e.g., the fluid vessel 11), this causes a rise in pressure in the hydraulic and/or fluid pump. After the user applies at least a portion of the user's weight to the hydraulic and/or fluid pump thereby causing a rise in pressure in the hydraulic and/or fluid pump, the increased pressure in the hydraulic and/or fluid pump causes at least a portion of the fluid in the hydraulic and/or fluid pump to flow to the turbine 28, e.g., through the feed line 9.

In one embodiment and as depicted in FIG. 3, the hydraulic and/or fluid circuit includes a first valve 25 and a second valve 26. In general valves 25, 26 control the direction that the fluid can flow in the system 10. In exemplary embodiments, valves 25, 26 are check valves of the appropriate volume flow capacity. Valves 25, 26 may be placed at any appropriate location in the hydraulic and/or fluid circuit. In exemplary embodiments, valves 25, 26 prevent the fluid from being forced into the turbine outlet on the power stroke, and also prevent the fluid from being pulled out of the turbine inlet on the return stroke.

In general, the hydraulic and/or fluid pump may be affixed to and/or embedded in the footwear 13 of the user in any desired location. In exemplary embodiments, when the user applies at least a portion of the user's weight to the hydraulic and/or fluid pump (e.g., when the user moves the appropriate foot), this thereby causes a rise in pressure in the hydraulic and/or fluid pump, which causes the hydraulic and/or fluid pump to force the working fluid to flow to the turbine 28, which thereby causes rotation of the turbine 28. Typically, the shaft 23 of the turbine 28 is connected to the input shaft of an electrical generator 24. The motion of the turbine 28 induces the motion of the electrical generator 24 and leads to the generation of electricity. In an exemplary embodiment, the system 10 further includes an external connection 7. The system 10 may be used to provide power to electronic devices 20. For example, the electricity may then be applied to charge the batteries of an electronic device 20. It is noted that gases, such as, for example, air, may be used as the working fluid in the system 10.

Figure 4:
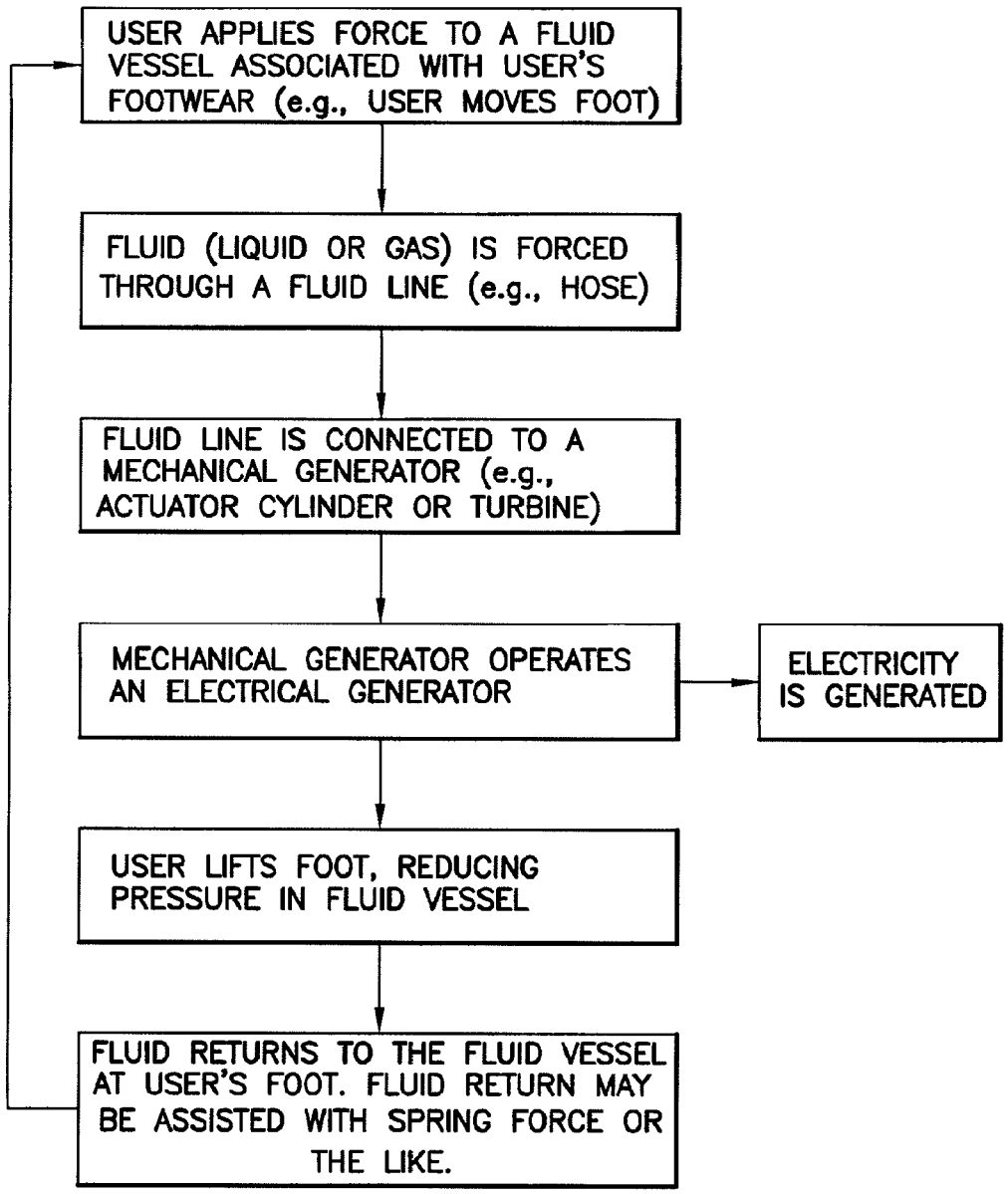
FIG. 4 is a block diagram of an embodiment of a method for generating electricity according to the present disclosure.

FIG. 4 illustrates an embodiment of a system/method for generating electricity while a user is moving. In exemplary embodiments of the present disclosure and as shown in FIG. 4, typically a user applies a force to a fluid vessel associated with the user's footwear (e.g., the user moves the user's foot, thereby applying at least a portion of the user's weight to the fluid vessel). In general, this causes a rise in pressure in the fluid vessel, and this increased pressure in the fluid vessel causes at least a portion of the fluid in the fluid vessel to flow to a mechanical generator (e.g., actuator cylinder or turbine) via a fluid line. Next, the mechanical generator typically operates an electrical generator, thereby generating electricity. The user may then utilize the generated electricity to provide power to electronic devices or the like. In exemplary embodiments, when the pressure in the fluid vessel is reduced (e.g., when the user lifts the user's foot so that no substantial portion of the user's weight is applied to the fluid vessel), the fluid then returns from the mechanical generator back to the fluid vessel at the user's footwear. The fluid return may be assisted with a spring force or the like. In exemplary embodiments, this cycle is repeated with each step/movement (e.g., each lifting of the foot) the user takes with the associated footwear.

With reference again to FIG. 1, the system 10 typically includes a power conditioning device and/or charge regulation/management device 6 and an external connection 7. In general, the system 10 provides power to electronic devices 20 via the external connection 7.

In general, the electrical load on electrical generator 4 is regulated/managed by the power conditioning device and/or charge regulation/management device 6. Typically, the largest electrical load serviceable by the electrical generator 4 is directly related to the amount of torque that is available from the mechanical generator 8 to turn/rotate the electrical generator 4 and the rate at which the electrical generator 4 is rotated/turned by the mechanical generator 8. For example, a high power output from the electrical generator 4 to a large electrical load typically requires a large pressure applied to the fluid in fluid vessel 11. However, the peak pressure applied to the fluid in fluid vessel 11 of system 10 is a function of multiple variables. For example, the peak pressure applied to the system 10 is a function of the weight and/or height of the user, the walking/running speed of the user, the type/material of the walking/running surface, etc.

In exemplary embodiments of the present disclosure, the system 10 includes an adjustment device (not shown) associated with (e.g., coupled to and/or in communication with) the power conditioning device and/or charge regulation/management device 6. In general, the adjustment device allows the user to manually adjust the charging load on the electrical generator 4 and tune the power conditioning device and/or charge regulation/management device 6 based upon the user's own characteristics (e.g., height/weight, running/walking speed, surface conditions, etc.), or based upon any desired criteria of the user, subject to the limit of the maximum peak pressure each individual could apply to the fluid vessel 11. Thus, in exemplary embodiments, system 10 is capable of being optimized for use based upon the specific characteristics of the individual user (e.g., weight, speed, etc.). In other words, each user of the system 10 would be able to tailor the charging load on the electrical generator 4 and tune the power conditioning device and/or charge regulation/management device 6 based upon the specific characteristics of the individual user.

In exemplary embodiments, the power conditioning device and/or charge regulation/management device 6 and/or the external connection 7 respond(s) dynamically to the pressure in the fluid system (e.g., the pressure applied to the fluid in fluid vessel 11). The system 10 may further include a pressure transducer or sensor or the like. The pressure transducer may be located at any location in the system 10. For example, pressure transducers or the like generally provide an electrical signal in response to a pressure, so that the pressure in a vessel or line can be correlated to the signal of the transducer. In exemplary embodiments, system 10 includes a pressure transducer, wherein the pressure transducer is configured to send and/or provide a signal to the power conditioning device and/or charge regulation/management device 6. After receiving the signal from the pressure transducer, the power conditioning device and/or charge regulation/management device 6 could then optimize (e.g., dynamically adjust) the electrical load in response to (e.g., based upon) the signal. For example, if the signal indicated high measured/sensed pressure pulses (e.g., high pressure applied to the fluid vessel 11), more energy would be sent to the load device (e.g., electronic device). If the signal indicated small pressure pulses, the load would be decreased.

In an alternative embodiment of the present disclosure, the system 10 includes a mass-flow sensor or the like, wherein the mass-flow sensor is configured to send and/or provide a signal to the power conditioning device and/or charge regulation/management device 6. After receiving the signal from the mass-flow sensor, the power conditioning device and/or charge regulation/management device 6 could then optimize the electrical load in response to the signal. For example, if the signal indicated a high measured/sensed mass-flow rate (e.g., high pressure applied to the fluid vessel 11), more energy would be sent to the load device. If the signal indicated a small mass-flow rate, the load would be decreased.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. An electricity generating system comprising:
a fluid vessel associated with footwear of a user, the fluid vessel configured and dimensioned to house a fluid and to expel at least a portion of the fluid from the fluid vessel when the user applies at least a portion of the user's weight to the fluid vessel, thereby applying a first force to the fluid vessel;
a mechanical-to-electrical generator sub-assembly in fluid communication with the fluid vessel through at least one fluid line, the mechanical-to-electrical generator sub-assembly configured and dimensioned to: (i) receive the fluid expelled from the fluid vessel in response to application of the first force to the fluid vessel, and (ii) generate electricity utilizing the expelled fluid, the mechanical-to-electrical generator sub-assembly including:
  (a) a mechanical generator in fluid communication with the fluid vessel, the mechanical generator including: (i) an actuating member configured and dimensioned to apply a second force to an elongated member in response to transmission of the expelled fluid from the fluid vessel, the elongated member being engaged with and effecting rotation of a driveshaft in response to application of the second force, and (ii) a spring member configured and dimensioned to apply a third force to the elongated member when the first force ceases to be applied to the fluid vessel, wherein application of the third force to the elongated member causes the elongated member to retract the actuating member;
  (b) an electrical generator coupled to the driveshaft, the electrical generator adapted to generate electricity based on rotation of the driveshaft; and
  (c) an external connection coupled to the electrical generator, the external connection configured to provide power to electronic devices or loads.

2. The system of claim 1, wherein the fluid vessel is selected from the group consisting of a hydraulic vessel, pneumatic vessel, hydraulic cylinder, pneumatic cylinder, hydraulic pump, pneumatic pump, hydraulic bladder and pneumatic bladder.

3. The system of claim 1, wherein the fluid vessel further comprises a first member and a second member, the first member and the second member configured and dimensioned to form a fluid cavity, the fluid cavity configured and dimensioned to house the fluid.

4. The system of claim 3, wherein the first member is positioned on top of the second member, and the first member and the second member are sealed at their edges to form the fluid cavity.

5. The system of claim 1, wherein the fluid vessel is embedded in or attached to the footwear.

6. The system of claim 1, wherein the actuating member is a piston, and wherein the elongated member is a pushrod.

7. The system of claim 6, wherein the motion of the pushrod is guided by a linear bearing of the mechanical-to-electrical generator sub-assembly, the linear bearing configured and dimensioned to limit the range of motion of the pushrod.

8. The system of claim 1, wherein the mechanical-to-electrical sub-assembly is not directly mounted to or embedded in the footwear.

9. The system of claim 1, wherein the application of the third force to the elongated member causes at least a portion of the expelled fluid to return to the fluid vessel.

10. The system of claim 1, wherein the elongated member includes engagement means at a first end of the elongated member that are configured and dimensioned to engage with the driveshaft; and
  wherein the driveshaft is secured to the mechanical-to-electrical generator sub-assembly via at least one driveshaft support, the at least one driveshaft support adapted to allow rotation of the driveshaft.

11. The system of claim 1, wherein the mechanical-to-electrical sub-assembly is attached or mounted to a waist-holster connected to the user.

12. The system of claim 1 further comprising:
  a charge regulation device in communication with the electrical generator; and
  an adjustment device in communication with the charge regulation device, the adjustment device configured to allow the user to adjust the charging load on the electrical generator and tune the charge regulation device.

13. The system of claim 1 further comprising:
  a charge regulation device in communication with the electrical generator; and
  a pressure transducer configured to provide a signal in response to a measured pressure of the system to the charge regulation device, wherein the charge regulation device dynamically adjusts the load on the electrical generator based upon the signal.

14. The system of claim 1 further comprising:
  a charge regulation device in communication with the electrical generator; and
  a mass-flow sensor configured to provide a signal in response to a measured flow of the system to the charge regulation device, wherein the charge regulation device dynamically adjusts the load on the electrical generator based upon the signal.

15. A method for generating electricity comprising:
  providing a fluid vessel associated with footwear of a user, the fluid vessel configured and dimensioned to house a fluid and to expel at least a portion of the fluid from the fluid vessel when the user applies at least a portion of the user's weight to the fluid vessel, thereby applying a first force to the fluid vessel;
  providing a mechanical-to-electrical generator sub-assembly in fluid communication with the fluid vessel through at least one fluid line, the mechanical-to-electrical generator sub-assembly configured and dimensioned to: (i) receive the fluid expelled from the fluid vessel in response to application of the first force to the fluid vessel, and (ii) generate electricity utilizing the expelled fluid, the mechanical-to-electrical generator sub-assembly including:
    (a) a mechanical generator in fluid communication with the fluid vessel, the mechanical generator including: (i) an actuating member configured and dimensioned to apply a second force to an elongated member in response to transmission of the expelled fluid from the fluid vessel, the elongated member being engaged with and effecting rotation of a driveshaft in response to application of the second force, and (ii) a spring member configured and dimensioned to apply a third force to the elongated member when the first force ceases to be applied to the fluid vessel, wherein application of the third force to the elongated member causes the elongated member to retract the actuating member;
    (b) an electrical generator coupled to the driveshaft, the electrical generator adapted to generate electricity based on rotation of the driveshaft; and
    (c) an external connection coupled to the electrical generator, the external connection configured to provide power to electronic devices or loads;
  applying a first force to the fluid vessel so that at least a portion of the fluid from the fluid vessel is expelled to the mechanical-to-electrical sub-assembly; and
  generating electricity with the mechanical-to-electrical generator sub-assembly by utilizing the expelled fluid.

16. The method of claim 15, wherein the actuating member is a piston, and wherein the elongated member is a pushrod.

17. The method of claim 16, wherein the motion of the pushrod is guided by a linear bearing of the mechanical-to-electrical generator sub-assembly, the linear bearing configured and dimensioned to limit the range of motion of the pushrod.

18. The method of claim 15, wherein the application of the third force to the elongated member causes at least a portion of the expelled fluid to return to the fluid vessel.

19. The method of claim 15, wherein the elongated member includes engagement means at a first end of the elongated member that are configured and dimensioned to engage with the driveshaft; and
   wherein the driveshaft is secured to the mechanical-to-electrical generator sub-assembly via at least one driveshaft support, the at least one driveshaft support adapted to allow rotation of the driveshaft.

20. The method of claim 15, wherein the fluid vessel further comprises a first member and a second member, the first member and the second member configured and dimensioned to form a fluid cavity, the fluid cavity configured and dimensioned to house the fluid; and
   wherein the first member is positioned on top of the second member, and the first member and the second member are sealed at their edges to form the fluid cavity.

21. An electricity generating system comprising:
   a fluid vessel associated with footwear of a user, the fluid vessel configured and dimensioned to house a fluid and to expel at least a portion of the fluid from the fluid vessel when the user applies at least a portion of the user's weight to the fluid vessel, thereby applying a first force to the fluid vessel;
   a mechanical-to-electrical generator sub-assembly in fluid communication with the fluid vessel through first and second fluid lines, the mechanical-to-electrical generator sub-assembly configured and dimensioned to: (i) receive the fluid expelled from the fluid vessel through the first fluid line in response to application of the first force to the fluid vessel, and (ii) generate electricity utilizing the expelled fluid, the mechanical-to-electrical generator sub-assembly including:
      (a) a mechanical generator in fluid communication with the fluid vessel through the first and second fluid lines, the mechanical generator configured and dimensioned to: (i) utilize the expelled fluid to effect rotation of a rotatable element in response to transmission of the expelled fluid from the fluid vessel through an inlet of the mechanical generator, the inlet in communication with the first line, and (ii) return the utilized fluid to a reservoir through an outlet in communication with the second line, the reservoir in fluid communication with the fluid vessel via the second fluid line;
      (b) an electrical generator coupled to the mechanical generator, the electrical generator adapted to generate electricity based on rotation of the rotatable element; and
      (c) an external connection coupled to the electrical generator, the external connection configured to provide power to electronic devices or loads;
   wherein the first fluid line includes a first valve and the second fluid line includes a second valve, the first and second valves configured and dimensioned to: (i) prevent the fluid from being forced into the mechanical generator outlet on the power stroke of the rotatable element, and (ii) prevent the fluid from being pulled out of the mechanical generator inlet on the return stroke of the rotatable element.

22. The system of claim 21, wherein the fluid vessel is selected from the group consisting of a hydraulic vessel, pneumatic vessel, hydraulic cylinder, pneumatic cylinder, hydraulic pump, pneumatic pump, hydraulic bladder and pneumatic bladder.

23. The system of claim 21, wherein the fluid vessel further comprises a first member and a second member, the first member and the second member configured and dimensioned to form a fluid cavity, the fluid cavity configured and dimensioned to house the fluid.

24. The system of claim 23, wherein the first member is positioned on top of the second member, and the first member and the second member are sealed at their edges to form the fluid cavity.

25. The system of claim 21, wherein the fluid vessel is embedded in or attached to the footwear.

26. The system of claim 21, wherein the mechanical-to-electrical sub-assembly is not directly mounted to or embedded in the footwear.

27. The system of claim 21, wherein the mechanical-to-electrical sub-assembly is attached or mounted to a waist-holster connected to the user.

28. The system of claim 21 further comprising:
   a charge regulation device in communication with the electrical generator; and
   an adjustment device in communication with the charge regulation device, the adjustment device configured to allow the user to adjust the charging load on the electrical generator and tune the charge regulation device.

29. The system of claim 21 further comprising:
   a charge regulation device in communication with the electrical generator; and
   a pressure transducer configured to provide a signal in response to a measured pressure of the system to the charge regulation device, wherein the charge regulation device dynamically adjusts the load on the electrical generator based upon the signal.

30. The system of claim 21 further comprising:
   a charge regulation device in communication with the electrical generator; and
   a mass-flow sensor configured to provide a signal in response to a measured flow of the system to the charge regulation device, wherein the charge regulation device dynamically adjusts the load on the electrical generator based upon the signal.

* * * * *